Dec. 13, 1927.
H. J. CLARK
1,652,700
DRAFT MECHANISM FOR WAGONS AND WAGON TRAINS
Filed July 15, 1926          2 Sheets-Sheet 1
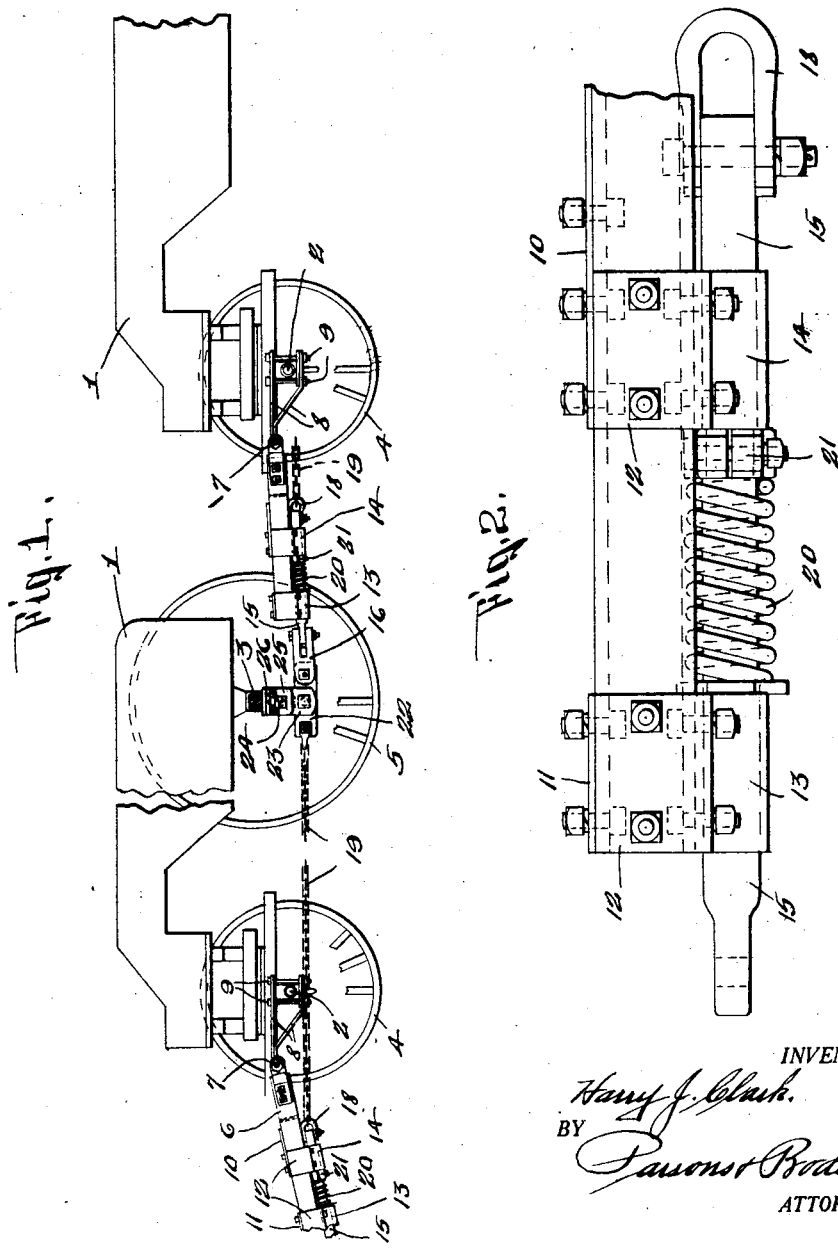
INVENTOR.
Harry J. Clark.
BY
Parsons & Bodell
ATTORNEYS.

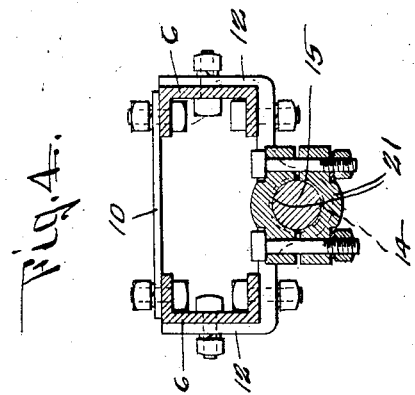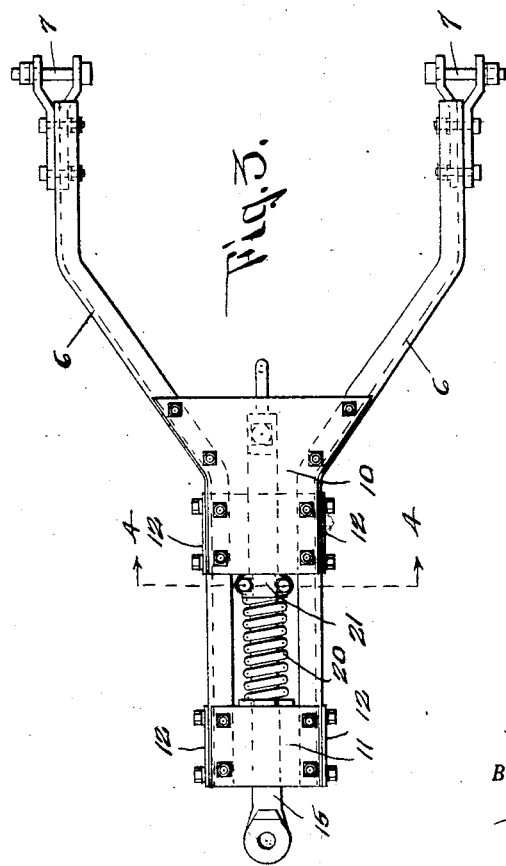

Patented Dec. 13, 1927.

1,652,700

UNITED STATES PATENT OFFICE.

HARRY J. CLARK, OF SYRACUSE, NEW YORK.

DRAFT MECHANISM FOR WAGONS AND WAGON TRAINS.

Application filed July 15, 1926. Serial No. 122,670.

This invention relates to draft mechanism for vehicles and particularly draft mechanism for wagon trains, and has for its object a particularly simple and efficient draft mechanism by which the body of the vehicle is relieved more or less of the pulling strain, and the draft is borne by the draft mechanism itself instead of by the frame of the vehicle.

The invention consists in the novel features and in the combinations and constructions hereinafter set forth and claimed.

In describing this invention, reference is had to the accompanying drawings in which like characters represent corresponding parts in all the views.

Figure 1 is a side elevation of a wagon train embodying my invention.

Figure 2 is an enlarged detail view of the draw bar and the contiguous portion of the tongue.

Figure 3 is the plan view of the tongue with the draw bar therein.

Figure 4 is a sectional view on line 4—4, Figure 3.

This invention comprises, generally, a vehicle having front and rear wheels, and a tongue and draft mechanism including a draw bar slidable lengthwise of the tongue, preferably against the tension of a spring and draft means as a cable connecting the draw bar and the rear axle. As wagons usually have front and rear axles, and also the front axle is usually turnable about a vertical axis, I have in the interest of brevity included this construction in most of the claims, but it will be understood that the invention is not limited to any particular wagon construction.

1 designates the wagon or other vehicle having the usual front and rear axles 2, 3 and the front and rear wheels 4, 5 mounted on the axles. The front axle is usually mounted upon a fifth wheel or other means by which it can be turned about an upright axis. The front axle is usually provided with a tongue.

When my invention is applied to a wagon having the usual tongue, the tongue 6 shown in Figures 2, 3 and 4 can be readily applied to the front axle 2. This tongue 6 is shown as formed up of angle iron and is hinged at its rear end on a horizontal axis 7 to forwardly extending brackets 8, which are secured to the front axle in any suitable manner as by bolts 9.

The side angle irons of the tongue 6 are secured together by gusset plates 10 and 11 bolted or riveted or otherwise secured thereto, and also additional plates 12 are secured to the sides of the angle iron strips of the tongue 6 and extend under the same, and carry guide blocks 13, 14 for the draw bar 15.

The draw bar 15 is slidably mounted in the guide blocks 13, 14 and is provided with a clevis 16 at its front end for connection to a tractor or to the draft mechanism of the preceding vehicle in a wagon train. The rear end of the draw bar is also provided with a clevis 18, which is connected by a chain or cable 19 to the rear axle through an equalizing lever as will be presently described.

The relative movement forwardly of the draw bar 15 is against the action of a spring 20 interposed between the shoulder 21 on the draw bar and the front bearing or guide 13 for the draw bar.

As here illustrated, the cable or chain 19 is connected at its rear end by coupling means to the front end of a draw bar connected to the rear axle to have a fore and aft movement. The draw bar is here illustrated as having two spaced apart depending links 23 which are pivoted at 24 to the depending flanges 25 of angle irons 26 secured to the rear axle and arranged back to back. Swinging movement of the draw bar 22 is limited by the draw bar abutting against the lower edges of the depending flanges 25 of the angle irons 26.

When the vehicle is connected in a wagon train, the front clevis 16 of the draw bar 15 of the trailing wagon is coupled to the rear end of the draw bar or lever 22 of the preceding vehicle. The clevis 16 is pivoted to the front draw bar 15 on a vertical axis and to the rear end of the lever 22 on a horizontal axis, so that the clevis acts as a sort of universal joint during the movement of the wagon train over uneven ground.

Obviously, in operation the pulling strain is borne by the draft mechanism, and not by the frames of the vehicles, and the pushing force applied to the frame of each vehicle through the rear axle neutralizes the pulling force applied to the frame of each vehicle to the spring 20.

What I claim is:

1. The combination of a vehicle having front and rear axles, wheels mounted on the axles, a tongue connected to the front axle, a draw bar slidably mounted in the tongue, a cable connected to the draw bar, a shoulder on the draw bar and a spring interposed between the shoulder and the tongue whereby the pull on the cable is directly applied to the rear axle and indirectly applied through the spring to the front end of the vehicle and draft means connected to the draw bar and the rear axle.

2. In a wagon train, the combination of a plurality of vehicles each having front and rear axles, wheels mounted on the axles, the front axles being turnable about vertical axes, tongues connected to front axles, draw bars carried by the tongues and movable lengthwise thereof, draw bars connected to the rear axles, the front and the rear draw bars of each vehicle and the front draw bar of each trailer wagon being connected at its front end to the rear draw bar of the preceding vehicle.

3. A wagon train comprising a plurality of vehicles, each having front and rear axles and wheels mounted on the axles the front wheels being turnable to steer the vehicle, draft means including draw bars associated with the front and rear axles of each vehicle and a cable connecting them, the front draw bar of each trailing wagon being coupled to the rear draw bar of the preceding wagon.

4. A wagon train comprising a plurality of vehicles, each having front and rear axles and wheels mounted on the axles, the front wheels being turnable to steer the vehicle, draft means including draw bars associated respectively with the front and rear axles of each wagon and movable forwardly and rearwardly, a cable connecting the draw bars and a spring for resisting relative movement of the draw bars, the front draw bar of a trailing wagon being coupled to the rear draw bar of the preceding wagon.

5. A wagon train comprising a plurality of vehicles, each having front and rear axles, wheels mounted on the axles and draft mechanism including a lever extending forwardly and rearwardly, depending links pivoted to the rear axle, the lever being pivoted between its ends to the links and constituting a rear draw bar, a draw bar at the front end of each vehicle, a cable connecting the draw bar and the front end of the lever of said vehicle, and the draw bar of each trailing vehicle being connected to the rear end of the lever of the preceding vehicle.

6. A wagon train comprising a plurality of vehicles, each having front and rear axles, wheels mounted on the axles, the front axles being turnable about vertical axes, a tongue connected to the front end of each vehicle, a draw bar mounted on each tongue to slide axially thereof, a spring for resisting such axial movement forwardly, a draw bar connected to the rear axle to move forwardly and rearwardly, a cable connecting the draw bars of each wagon and the front draw bar of each trailing vehicle being connected to the rear end of the draw bar of the next preceding wagon.

In testimony whereof, I have hereunto signed my name, at Syracuse, in the county of Onondaga and in the State of New York, this 18th day of June, 1926.

HARRY J. CLARK.